(12) United States Patent
Yin et al.

(10) Patent No.: US 8,557,727 B2
(45) Date of Patent: Oct. 15, 2013

(54) METHOD OF FORMING A CATALYST WITH INHIBITED MOBILITY OF NANO-ACTIVE MATERIAL

(75) Inventors: Qinghua Yin, Tempe, AZ (US); Xiwang Qi, Scottsdale, AZ (US); Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 311 days.

(21) Appl. No.: 12/962,508

(22) Filed: Dec. 7, 2010

(65) Prior Publication Data
US 2011/0143926 A1    Jun. 16, 2011

Related U.S. Application Data

(60) Provisional application No. 61/284,329, filed on Dec. 15, 2009.

(51) Int. Cl.
| | |
|---|---|
| *B01J 21/00* | (2006.01) |
| *B01J 23/00* | (2006.01) |
| *B01J 23/08* | (2006.01) |
| *B01J 23/42* | (2006.01) |
| *B01J 23/44* | (2006.01) |
| *B01J 25/00* | (2006.01) |
| *B01J 29/00* | (2006.01) |
| *B01J 31/00* | (2006.01) |

(52) U.S. Cl.
USPC ........... 502/167; 502/100; 502/150; 502/172; 502/300; 502/334; 502/339; 502/527.14; 502/527.24; 977/773; 977/810; 977/811; 977/840; 977/963

(58) Field of Classification Search
USPC ......... 502/100, 150, 167, 172, 300, 334, 339, 502/355, 527.14, 527.24; 977/773, 840, 977/901, 810, 811, 963
See application file for complete search history.

(56) References Cited

U.S. PATENT DOCUMENTS

| | | | |
|---|---|---|---|
| 2,284,554 A | 5/1942 | Beyerstedt | 196/10 |
| 2,419,042 A | 4/1947 | Todd | 202/205 |
| 2,519,531 A | 8/1950 | Worn | 230/95 |

(Continued)

FOREIGN PATENT DOCUMENTS

| | | |
|---|---|---|
| JP | 56-146804 | 11/1981 |
| JP | 61-086815 A | 5/1986 |

(Continued)

OTHER PUBLICATIONS

"Structure and activity of composite oxide supported platinum-iridium catalysts," S. Subramanian et al. Applied Catalysis, 74 (1991), pp. 65-81.*

(Continued)

*Primary Examiner* — Patricia L Hailey
(74) *Attorney, Agent, or Firm* — Morrison & Foerster LLP (57) ABSTRACT

A method of forming a catalyst, comprising: providing a plurality of support particles and a plurality of mobility-inhibiting particles, wherein each support particle in the plurality of support particles is bonded with its own catalytic particle; and bonding the plurality of mobility-inhibiting particles to the plurality of support particles, wherein each support particle is separated from every other support particle in the plurality of support particles by at least one of the mobility-inhibiting particles, and wherein the mobility-inhibiting particles are configured to prevent the catalytic particles from moving from one support particle to another support particle.

40 Claims, 7 Drawing Sheets

(56) References Cited

U.S. PATENT DOCUMENTS

| | | | |
|---|---|---|---|
| 2,562,753 A | 7/1951 | Trost | 241/39 |
| 2,689,780 A | 9/1954 | Rice | 23/106 |
| 3,001,402 A | 9/1961 | Koblin | 73/421.5 |
| 3,067,025 A | 12/1962 | Chisholm | 75/84.5 |
| 3,145,287 A | 8/1964 | Siebein et al. | |
| 3,178,121 A | 4/1965 | Wallace, Jr. | 241/5 |
| 3,179,782 A | 4/1965 | Matvay | |
| 3,313,908 A | 4/1967 | Unger et al. | |
| 3,401,465 A | 9/1968 | Larwill | 34/57 |
| 3,450,926 A | 6/1969 | Kieman | 313/231 |
| 3,457,788 A | 7/1969 | Miyajima | 73/422 |
| 3,537,513 A | 11/1970 | Austin | 165/70 |
| 3,552,653 A | 1/1971 | Inoue | |
| 3,617,358 A | 11/1971 | Dittrich | |
| 3,667,111 A | 6/1972 | Chartet | |
| 3,741,001 A | 6/1973 | Fletcher et al. | 73/28 |
| 3,752,172 A | 8/1973 | Cohen et al. | 137/12 |
| 3,774,442 A | 11/1973 | Gustavsson | 73/28 |
| 3,830,756 A | 8/1974 | Sanchez et al. | |
| 3,871,448 A | 3/1975 | Vann et al. | |
| 3,892,882 A | 7/1975 | Guest et al. | 427/34 |
| 3,914,573 A | 10/1975 | Muehlberger | 219/76 |
| 3,959,420 A | 5/1976 | Geddes et al. | 261/112 |
| 3,969,482 A | 7/1976 | Teller | |
| 4,008,620 A | 2/1977 | Narato et al. | 73/421.5 A |
| 4,018,388 A | 4/1977 | Andrews | 241/39 |
| 4,139,497 A | 2/1979 | Castor et al. | 252/470 |
| 4,157,316 A | 6/1979 | Thompson et al. | |
| 4,171,288 A | 10/1979 | Keith et al. | 252/462 |
| 4,174,298 A | 11/1979 | Antos | |
| 4,227,928 A | 10/1980 | Wang | |
| 4,248,387 A | 2/1981 | Andrews | 241/5 |
| 4,253,917 A | 3/1981 | Wang | |
| 4,284,609 A | 8/1981 | deVries | 423/242 |
| 4,369,167 A | 1/1983 | Weir | |
| 4,388,274 A | 6/1983 | Rourke et al. | 422/177 |
| 4,431,750 A | 2/1984 | McGinnis et al. | |
| 4,436,075 A | 3/1984 | Campbell et al. | 123/557 |
| 4,458,138 A | 7/1984 | Adrian et al. | |
| 4,459,327 A | 7/1984 | Wang | |
| 4,505,945 A | 3/1985 | Dubust et al. | |
| 4,513,149 A | 4/1985 | Gray et al. | 564/449 |
| RE32,244 E | 9/1986 | Andersen | |
| 4,723,589 A | 2/1988 | Iyer et al. | |
| 4,731,517 A | 3/1988 | Cheney | |
| 4,764,283 A | 8/1988 | Ashbrook et al. | 210/695 |
| 4,765,805 A | 8/1988 | Wahl et al. | |
| 4,824,624 A | 4/1989 | Palicka et al. | 264/67 |
| 4,855,505 A | 8/1989 | Koll | 564/398 |
| 4,866,240 A | 9/1989 | Webber | 219/121.47 |
| 4,885,038 A | 12/1989 | Anderson et al. | |
| 4,983,555 A | 1/1991 | Roy et al. | 501/120 |
| 4,987,033 A | 1/1991 | Abkowitz et al. | 428/469 |
| 5,015,863 A | 5/1991 | Takeshima et al. | |
| 5,041,713 A | 8/1991 | Weidman | 219/121.51 |
| 5,043,548 A | 8/1991 | Whitney et al. | 219/121.84 |
| 5,070,064 A | 12/1991 | Hsu et al. | |
| 5,073,193 A | 12/1991 | Chaklader et al. | 75/346 |
| 5,157,007 A | 10/1992 | Domesle et al. | |
| 5,230,844 A | 7/1993 | Macaire et al. | |
| 5,233,153 A | 8/1993 | Coats | |
| 5,338,716 A | 8/1994 | Triplett et al. | |
| 5,369,241 A | 11/1994 | Taylor et al. | 219/121.47 |
| 5,371,049 A | 12/1994 | Moffett et al. | 501/89 |
| 5,372,629 A | 12/1994 | Anderson et al. | 75/332 |
| 5,392,797 A | 2/1995 | Welch | 134/108 |
| 5,439,865 A | 8/1995 | Abe et al. | 502/333 |
| 5,442,153 A | 8/1995 | Marantz et al. | 219/121.47 |
| 5,460,701 A | 10/1995 | Parker et al. | |
| 5,464,458 A | 11/1995 | Yamamoto | |
| 5,485,941 A | 1/1996 | Guyomard et al. | 222/1 |
| 5,534,149 A | 7/1996 | Birkenbeil et al. | 210/636 |
| 5,553,507 A | 9/1996 | Basch et al. | 73/863.01 |
| 5,562,966 A | 10/1996 | Clarke et al. | |
| 5,582,807 A | 12/1996 | Liao et al. | |
| 5,611,896 A | 3/1997 | Swanepoel et al. | 204/169 |
| 5,630,322 A | 5/1997 | Heilmann et al. | 62/95 |
| 5,652,304 A | 7/1997 | Calderon et al. | |
| 5,723,187 A | 3/1998 | Popoola et al. | |
| 5,726,414 A | 3/1998 | Kitahashi et al. | |
| 5,749,938 A | 5/1998 | Coombs | 75/332 |
| 5,776,359 A | 7/1998 | Schultz et al. | 252/62.51 |
| 5,788,738 A | 8/1998 | Pirzada et al. | 75/331 |
| 5,811,187 A | 9/1998 | Anderson et al. | 428/403 |
| 5,837,959 A | 11/1998 | Muehlberger et al. | 219/121.47 |
| 5,851,507 A | 12/1998 | Pirzada et al. | 423/659 |
| 5,853,815 A | 12/1998 | Muehlberger | 427/446 |
| 5,858,470 A | 1/1999 | Bernecki et al. | |
| 5,905,000 A | 5/1999 | Yadav et al. | 429/33 |
| 5,935,293 A | 8/1999 | Detering et al. | 75/10.29 |
| 5,973,289 A | 10/1999 | Read et al. | |
| 5,989,648 A | 11/1999 | Phillips | 427/456 |
| 5,993,967 A | 11/1999 | Brotzman, Jr. et al. | 428/407 |
| 5,993,988 A | 11/1999 | Ohara et al. | 429/40 |
| 6,004,620 A | 12/1999 | Camm | |
| 6,012,647 A | 1/2000 | Ruta et al. | 239/132.1 |
| 6,033,781 A | 3/2000 | Brotzman, Jr. et al. | 428/405 |
| 6,045,765 A | 4/2000 | Nakatsuji et al. | |
| 6,059,853 A | 5/2000 | Coombs | 75/332 |
| 6,084,197 A | 7/2000 | Fusaro, Jr. | |
| 6,102,106 A | 8/2000 | Manning et al. | 165/76 |
| 6,117,376 A | 9/2000 | Merkel | |
| 6,213,049 B1 | 4/2001 | Yang | 118/723 |
| 6,214,195 B1 | 4/2001 | Yadav et al. | 205/334 |
| 6,228,904 B1 | 5/2001 | Yadav et al. | 523/210 |
| 6,254,940 B1 | 7/2001 | Pratsinis et al. | 427/562 |
| 6,261,484 B1 | 7/2001 | Phillips et al. | 264/5 |
| 6,267,864 B1 | 7/2001 | Yadav et al. | 205/341 |
| 6,322,756 B1 | 11/2001 | Arno et al. | |
| 6,342,465 B1 | 1/2002 | Klein et al. | |
| 6,344,271 B1 | 2/2002 | Yadav et al. | 428/402 |
| 6,379,419 B1 | 4/2002 | Celik et al. | 75/346 |
| 6,387,560 B1 | 5/2002 | Yadav et al. | 429/45 |
| 6,395,214 B1 | 5/2002 | Kear et al. | 264/434 |
| 6,398,843 B1 | 6/2002 | Tarrant | 75/249 |
| 6,409,851 B1 | 6/2002 | Sethuram et al. | 148/565 |
| 6,413,781 B1 | 7/2002 | Geis et al. | 436/178 |
| 6,416,818 B1 | 7/2002 | Aikens et al. | 427/383.1 |
| RE37,853 E | 9/2002 | Detering et al. | 75/10.19 |
| 6,444,009 B1 | 9/2002 | Liu et al. | 75/332 |
| 6,475,951 B1 | 11/2002 | Domesle et al. | |
| 6,506,995 B1 | 1/2003 | Fusaro, Jr. et al. | |
| 6,517,800 B1 | 2/2003 | Cheng et al. | 423/447.1 |
| 6,524,662 B2 | 2/2003 | Jang et al. | 427/535 |
| 6,531,704 B2 | 3/2003 | Yadav et al. | 250/493.1 |
| 6,548,445 B1 | 4/2003 | Buysch et al. | |
| 6,554,609 B2 | 4/2003 | Yadav et al. | 432/9 |
| 6,562,304 B1 | 5/2003 | Mizrahi | |
| 6,562,495 B2 | 5/2003 | Yadav et al. | 429/12 |
| 6,569,397 B1 | 5/2003 | Yadav et al. | 423/345 |
| 6,569,518 B2 | 5/2003 | Yadav et al. | 428/323 |
| 6,572,672 B2 | 6/2003 | Yadav et al. | 75/343 |
| 6,579,446 B1 | 6/2003 | Teran et al. | |
| 6,596,187 B2 | 7/2003 | Coll et al. | 216/56 |
| 6,603,038 B1 | 8/2003 | Hagemeyer et al. | 560/241.1 |
| 6,607,821 B2 | 8/2003 | Yadav et al. | 428/323 |
| 6,610,355 B2 | 8/2003 | Yadav et al. | 427/115 |
| 6,623,559 B2 | 9/2003 | Huang | 117/87 |
| 6,635,357 B2 | 10/2003 | Moxson et al. | 428/548 |
| 6,641,775 B2 | 11/2003 | Vigliotti et al. | 264/618 |
| 6,652,822 B2 | 11/2003 | Phillips et al. | 423/290 |
| 6,652,967 B2 | 11/2003 | Yadav et al. | 428/403 |
| 6,669,823 B1 | 12/2003 | Sarkas et al. | 204/164 |
| 6,682,002 B2 | 1/2004 | Kyotani | 239/318 |
| 6,689,192 B1 | 2/2004 | Phillips et al. | 75/342 |
| 6,699,398 B1 | 3/2004 | Kim | 216/55 |
| 6,706,097 B2 | 3/2004 | Zornes | 96/153 |
| 6,706,660 B2 | 3/2004 | Park | |
| 6,710,207 B2 | 3/2004 | Bogan, Jr. et al. | |
| 6,713,176 B2 | 3/2004 | Yadav et al. | 428/402 |
| 6,716,525 B1 | 4/2004 | Yadav et al. | 428/402 |
| 6,744,006 B2 | 6/2004 | Johnson et al. | |
| 6,746,791 B2 | 6/2004 | Yadav et al. | 429/30 |
| 6,772,584 B2 | 8/2004 | Chun et al. | 60/275 |

(56) References Cited

U.S. PATENT DOCUMENTS

| | | |
|---|---|---|
| 6,786,950 B2 | 9/2004 | Yadav et al. .................. 75/346 |
| 6,813,931 B2 | 11/2004 | Yadav et al. ................ 73/31.05 |
| 6,817,388 B2 | 11/2004 | Tsangaris et al. .............. 141/82 |
| 6,832,735 B2 | 12/2004 | Yadav et al. .................. 241/16 |
| 6,838,072 B1 | 1/2005 | Kong et al. ................ 423/594.2 |
| 6,841,509 B1* | 1/2005 | Hwang et al. ................ 502/180 |
| 6,855,410 B2 | 2/2005 | Buckley |
| 6,855,426 B2 | 2/2005 | Yadav .......................... 428/403 |
| 6,855,749 B1 | 2/2005 | Yadav et al. ................. 523/105 |
| 6,886,545 B1 | 5/2005 | Holm ...................... 123/568.21 |
| 6,896,958 B1 | 5/2005 | Cayton et al. ................. 428/323 |
| 6,902,699 B2 | 6/2005 | Fritzemeier et al. ............ 419/38 |
| 6,916,872 B2 | 7/2005 | Yadav et al. .................. 524/430 |
| 6,919,527 B2 | 7/2005 | Boulos et al. ............. 219/121.52 |
| 6,933,331 B2 | 8/2005 | Yadav et al. ................. 523/210 |
| 6,972,115 B1 | 12/2005 | Ballard |
| 6,986,877 B2 | 1/2006 | Takikawa et al. ........... 423/447.3 |
| 6,994,837 B2 | 2/2006 | Boulos et al. ................ 423/613 |
| 7,007,872 B2 | 3/2006 | Yadav et al. ..................... 241/1 |
| 7,022,305 B2 | 4/2006 | Drumm et al. |
| 7,052,777 B2 | 5/2006 | Brotzman, Jr. et al. ....... 428/570 |
| 7,073,559 B2 | 7/2006 | O'Larey et al. .............. 164/76.1 |
| 7,081,267 B2 | 7/2006 | Yadav .......................... 427/115 |
| 7,101,819 B2 | 9/2006 | Rosenflanz et al. ............ 501/10 |
| 7,147,544 B2 | 12/2006 | Rosenflanz ..................... 451/28 |
| 7,147,894 B2 | 12/2006 | Zhou et al. .................... 427/256 |
| 7,166,198 B2 | 1/2007 | Van Der Walt et al. ....... 204/165 |
| 7,166,663 B2 | 1/2007 | Cayton et al. ................. 524/430 |
| 7,172,649 B2 | 2/2007 | Conrad et al. .................. 106/35 |
| 7,172,790 B2 | 2/2007 | Koulik et al. ................. 427/212 |
| 7,178,747 B2 | 2/2007 | Yadav et al. ................... 241/21 |
| 7,208,126 B2 | 4/2007 | Musick et al. .................. 423/69 |
| 7,211,236 B2 | 5/2007 | Stark et al. ................. 423/592.1 |
| 7,217,407 B2 | 5/2007 | Zhang .......................... 423/610 |
| 7,220,398 B2 | 5/2007 | Sutorik et al. ............... 423/593.1 |
| 7,265,076 B2* | 9/2007 | Taguchi et al. ................ 502/326 |
| 7,307,195 B2 | 12/2007 | Polverejan et al. ............ 585/443 |
| 7,323,655 B2 | 1/2008 | Kim ........................ 219/121.43 |
| 7,384,447 B2 | 6/2008 | Kodas et al. ................... 75/332 |
| 7,417,008 B2 | 8/2008 | Richards et al. |
| 7,494,527 B2 | 2/2009 | Jurewicz et al. ................ 75/346 |
| 7,541,012 B2 | 6/2009 | Yeung et al. |
| 7,541,310 B2 | 6/2009 | Espinoza et al. |
| 7,557,324 B2 | 7/2009 | Nylen et al. |
| 7,572,315 B2 | 8/2009 | Boulos et al. ................... 75/336 |
| 7,611,686 B2 | 11/2009 | Alekseeva et al. ............ 423/276 |
| 7,615,097 B2 | 11/2009 | McKechnie et al. ............ 75/346 |
| 7,618,919 B2 | 11/2009 | Shimazu et al. |
| 7,622,693 B2 | 11/2009 | Foret ........................ 219/121.43 |
| 7,632,775 B2* | 12/2009 | Zhou et al. .................... 502/300 |
| 7,678,419 B2 | 3/2010 | Kevwitch et al. |
| 7,709,411 B2* | 5/2010 | Zhou et al. .................... 502/300 |
| 7,750,265 B2 | 7/2010 | Belashchenko et al. |
| 7,803,210 B2 | 9/2010 | Sekine et al. ................... 75/334 |
| 7,851,405 B2* | 12/2010 | Wakamatsu et al. .......... 502/332 |
| 7,874,239 B2 | 1/2011 | Howland |
| 7,897,127 B2 | 3/2011 | Layman et al. |
| 7,905,942 B1 | 3/2011 | Layman |
| 8,051,724 B1 | 11/2011 | Layman et al. |
| 8,076,258 B1 | 12/2011 | Biberger |
| 8,080,494 B2* | 12/2011 | Yasuda et al. ................. 502/327 |
| 8,142,619 B2 | 3/2012 | Layman et al. |
| 8,294,060 B2 | 10/2012 | Mohanty et al. |
| 2001/0042802 A1 | 11/2001 | Youds ............................. 241/5 |
| 2002/0018815 A1 | 2/2002 | Sievers et al. ................. 424/489 |
| 2002/0068026 A1 | 6/2002 | Murrell et al. ................ 422/211 |
| 2002/0079620 A1 | 6/2002 | DuBuis et al. ........... 264/328.14 |
| 2002/0100751 A1 | 8/2002 | Carr .............................. 219/209 |
| 2002/0102674 A1 | 8/2002 | Anderson ..................... 435/174 |
| 2002/0131914 A1 | 9/2002 | Sung |
| 2002/0143417 A1 | 10/2002 | Ito et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. .................... 607/96 |
| 2003/0042232 A1 | 3/2003 | Shimazu .................. 219/121.47 |
| 2003/0047617 A1 | 3/2003 | Shanmugham et al. |
| 2003/0066800 A1 | 4/2003 | Saim et al. ........................ 264/5 |
| 2003/0108459 A1 | 6/2003 | Wu et al. .................. 422/186.04 |
| 2003/0110931 A1 | 6/2003 | Aghajanian et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. ............... 501/87 |
| 2003/0223546 A1 | 12/2003 | McGregor et al. ............ 378/143 |
| 2004/0009118 A1 | 1/2004 | Phillips et al. ............. 423/592.1 |
| 2004/0023302 A1 | 2/2004 | Archibald et al. .............. 435/7.1 |
| 2004/0023453 A1 | 2/2004 | Xu et al. ........................ 257/369 |
| 2004/0077494 A1 | 4/2004 | LaBarge et al. ............... 502/303 |
| 2004/0103751 A1 | 6/2004 | Joseph et al. ................. 75/10.19 |
| 2004/0119064 A1 | 6/2004 | Narayan et al. |
| 2004/0127586 A1 | 7/2004 | Jin et al. |
| 2004/0167009 A1 | 8/2004 | Kuntz et al. ................... 501/95.2 |
| 2004/0176246 A1 | 9/2004 | Shirk et al. .................... 502/439 |
| 2004/0208805 A1 | 10/2004 | Fincke et al. |
| 2004/0213998 A1 | 10/2004 | Hearley et al. ................ 428/402 |
| 2004/0238345 A1 | 12/2004 | Koulik et al. |
| 2004/0251017 A1 | 12/2004 | Pillion et al. .................. 165/289 |
| 2004/0251241 A1 | 12/2004 | Blutke et al. |
| 2005/0000321 A1 | 1/2005 | O'Larey et al. ................. 75/952 |
| 2005/0000950 A1 | 1/2005 | Schroder et al. .......... 219/121.59 |
| 2005/0066805 A1 | 3/2005 | Park et al. |
| 2005/0077034 A1 | 4/2005 | King ............................. 165/163 |
| 2005/0097988 A1 | 5/2005 | Kodas et al. .................... 75/332 |
| 2005/0106865 A1 | 5/2005 | Chung et al. |
| 2005/0163673 A1 | 7/2005 | Johnson et al. |
| 2005/0199739 A1 | 9/2005 | Kuroda et al. ................... 239/13 |
| 2005/0220695 A1 | 10/2005 | Abatzoglou et al. .......... 423/445 |
| 2005/0227864 A1 | 10/2005 | Sutorik et al. |
| 2005/0233380 A1 | 10/2005 | Persiri et al. ................... 435/7.1 |
| 2005/0240069 A1 | 10/2005 | Polverejan et al. ............ 585/444 |
| 2005/0258766 A1 | 11/2005 | Kim ........................... 315/111.21 |
| 2005/0275143 A1 | 12/2005 | Toth |
| 2006/0051505 A1 | 3/2006 | Kortshagen et al. .......... 427/212 |
| 2006/0068989 A1 | 3/2006 | Ninomiya et al. ............. 502/339 |
| 2006/0094595 A1 | 5/2006 | Labarge |
| 2006/0096393 A1 | 5/2006 | Pesiri ......................... 73/863.21 |
| 2006/0105910 A1* | 5/2006 | Zhou et al. ..................... 502/338 |
| 2006/0108332 A1 | 5/2006 | Belashchenko .......... 219/121.47 |
| 2006/0153728 A1 | 7/2006 | Schoenung et al. ............. 419/32 |
| 2006/0153765 A1 | 7/2006 | Pham-Huu et al. ........... 423/345 |
| 2006/0159596 A1 | 7/2006 | De La Veaux et al. ........ 422/151 |
| 2006/0166809 A1 | 7/2006 | Malek et al. |
| 2006/0222780 A1 | 10/2006 | Gurevich et al. |
| 2006/0231525 A1 | 10/2006 | Asakawa et al. ................ 216/56 |
| 2007/0048206 A1 | 3/2007 | Hung et al. .................... 423/335 |
| 2007/0049484 A1 | 3/2007 | Kear et al. |
| 2007/0063364 A1 | 3/2007 | Hsiao et al. ........................ 264/5 |
| 2007/0084308 A1 | 4/2007 | Nakamura et al. .............. 75/346 |
| 2007/0084834 A1 | 4/2007 | Hanus et al. ................ 219/121.5 |
| 2007/0087934 A1 | 4/2007 | Martens et al. ................ 502/214 |
| 2007/0163385 A1 | 7/2007 | Takahashi et al. |
| 2007/0173403 A1 | 7/2007 | Koike et al. ................... 502/300 |
| 2007/0178673 A1 | 8/2007 | Gole et al. |
| 2007/0221404 A1 | 9/2007 | Das et al. |
| 2007/0253874 A1 | 11/2007 | Foret ........................ 422/186.07 |
| 2007/0292321 A1 | 12/2007 | Plischke et al. ................ 422/198 |
| 2008/0006954 A1 | 1/2008 | Yubuta et al. |
| 2008/0031806 A1 | 2/2008 | Gavenonis et al. |
| 2008/0038578 A1 | 2/2008 | Li |
| 2008/0057212 A1 | 3/2008 | Dorier et al. |
| 2008/0064769 A1 | 3/2008 | Sato et al. |
| 2008/0105083 A1 | 5/2008 | Nakamura et al. .............. 75/255 |
| 2008/0116178 A1 | 5/2008 | Weidman .................. 219/121.47 |
| 2008/0125308 A1 | 5/2008 | Fujdala et al. |
| 2008/0138651 A1 | 6/2008 | Doi et al. |
| 2008/0175936 A1 | 7/2008 | Tokita et al. |
| 2008/0187714 A1* | 8/2008 | Wakamatsu et al. .......... 428/117 |
| 2008/0206562 A1 | 8/2008 | Stucky et al. |
| 2008/0207858 A1 | 8/2008 | Kowaleski et al. ............ 526/176 |
| 2008/0274344 A1 | 11/2008 | Vieth et al. |
| 2008/0277092 A1 | 11/2008 | Layman et al. |
| 2008/0277264 A1 | 11/2008 | Sprague |
| 2008/0277267 A1 | 11/2008 | Biberger et al. |
| 2008/0277268 A1 | 11/2008 | Layman |

(56) References Cited

U.S. PATENT DOCUMENTS

| | | |
|---|---|---|
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2009/0010801 A1 | 1/2009 | Murphy et al. |
| 2009/0054230 A1 | 2/2009 | Veeraraghavan et al. |
| 2009/0088585 A1 | 4/2009 | Schammel et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0223410 A1 | 9/2009 | Jun et al. |
| 2009/0253037 A1 | 10/2009 | Park et al. |
| 2009/0274903 A1 | 11/2009 | Addiego |
| 2009/0286899 A1 | 11/2009 | Hofmann et al. |
| 2010/0089002 A1 | 4/2010 | Merkel |
| 2010/0275781 A1 | 11/2010 | Tsangaris |
| 2011/0006463 A1 | 1/2011 | Layman |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0158871 A1 | 6/2011 | Arnold et al. |
| 2011/0174604 A1 | 7/2011 | Duesel et al. |
| 2011/0247336 A9 | 10/2011 | Farsad et al. |
| 2012/0045373 A1 | 2/2012 | Biberger |
| 2012/0171098 A1 | 7/2012 | Hung et al. |

FOREIGN PATENT DOCUMENTS

| | | | |
|---|---|---|---|
| JP | 63-214342 | A | 9/1988 |
| JP | 05-228361 | A | 9/1993 |
| JP | 05-324094 | A | 12/1993 |
| JP | 6-272012 | A | 9/1994 |
| JP | H6-065772 | | 9/1994 |
| JP | 7031873 | A | 2/1995 |
| JP | 07-256116 | | 10/1995 |
| JP | 11-502760 | A | 3/1999 |
| JP | 2000-220978 | A | 8/2000 |
| JP | 2004-233007 | A | 8/2004 |
| JP | 2004-249206 | A | 9/2004 |
| JP | 2004-290730 | A | 10/2004 |
| JP | 2005-503250 | A | 2/2005 |
| JP | 2005-122621 | A | 5/2005 |
| JP | 2005-218937 | A | 8/2005 |
| JP | 2005-342615 | A | 12/2005 |
| JP | 2006-001779 | A | 1/2006 |
| JP | 2006-508885 | A | 3/2006 |
| JP | 2006-247446 | A | 9/2006 |
| JP | 2006-260385 | A | 9/2006 |
| JP | 2007-46162 | A | 2/2007 |
| SU | 493241 | | 3/1976 |
| TW | 201023207 | | 6/2010 |
| WO | WO-96/28577 | A1 | 9/1996 |
| WO | WO 02/092503 | A1 | 11/2002 |
| WO | WO 2004/052778 | A2 | 6/2004 |
| WO | WO 2006/079213 | A1 | 8/2006 |
| WO | WO-2008/130451 | A2 | 10/2008 |
| WO | WO-2008/130451 | A3 | 10/2008 |
| WO | 2011/081833 | * | 7/2011 |

OTHER PUBLICATIONS

A. Gutsch et al., "Gas-Phase Production of Nanoparticles", Kona No. 20, 2002, pp. 24-37.

Dr. Heike Mühlenweg et al., "Gas-Phase Reactions—Open Up New Roads to Nanoproducts", Degussa ScienceNewsletter No. 08, 2004, pp. 12-16.

Coating Generation: Vaporization of particles in Plasma Spraying and Splat Formation, M. Vardelle, A. Vardelle, K-I li, P. Fauchais, Universite de Limoges, 123 Avenue A. Thomas 87000, Limoges, F. , Pure & Chem, vol. 68, No. 5, pp. 1093-1099, 1996.

H. Konrad et al., "Nanostructured Cu-Bi Alloys Prepared by Co-Evaporation in a Continuous Gas Flow," NanoStructured Materials, vol. 7, No. 6, 1996, pp. 605-610.

Kenvin et al. "Supported Catalysts Prepared from Mononuclear Copper Complexes: Catalytic Properties", Journal of Catalysis, pp. 81-91, (1992).

J. Heberlein, "New Approaches in Thermal Plasma Technology", Pure Appl. Chem., vol. 74, No. 3, 2002, pp. 327-335.

M. Vardelle et al., "Experimental Investigation of Powder Vaporization in Thermal Plasma Jets," Plasma Chemistry and Plasma Processing, vol. 11, No. 2, Jun. 1991, pp. 185-201.

National Aeronautics and Space Administration, "Enthalpy", http://www.grc.nasa.gov/WWW/K-12/airplane/enthalpy.html, Nov. 23, 2009, 1 page.

P. Fauchais et al., "Plasma Spray: Study of the Coating Generation," Ceramics International, Elsevier, Amsterdam, NL, vol. 22, No. 4, Jan. 1996, pp. 295-303.

P. Fauchais et al., "Les Dépôts Par Plasma Thermique," Revue Generale De L'Electricitie, RGE. Paris, FR, No. 2, Jan. 1993, pp. 7-12.

P. Fauchais et al, "La Projection Par Plasma: Une Revue," Annales De Physique, vol. 14, No. 3, Jun. 1989, pp. 261-310.

T. Yoshida, "The Future of Thermal Plasma Processing for Coating", Pure & Appl. Chem., vol. 66, No. 6, 1994 pp. 1223-1230.

Han et al, Deformation Mechanisms and Ductility of Nanostructured Al Alloys, Mat. Res. Soc. Symp. Proc. vol. 821, Jan. 2004, Material Research Society, http://www.mrs.org/s_mrs/bin.asp?CID=2670&DOC=FILE.PDF., 6 pages.

Nagai, Yasutaka, et al. "Sintering Inhibition Mechanism of Platinum Supported on Ceria-based Oxide and Pt-oxide-support Interaction,"Journal of Catalysis 242 (2006), pp. 103-109, Jul. 3, 2006, Elsevier.

Derwent English Abstract for publication No. SU 193241 A, Application No. 1973SU1943286 filed on Jul. 2, 1973, published on Mar. 1, 1976, entitled "Catalyst for Ammonia Synthesis Contains Oxides of Aluminium, Potassium, Calcium, Iron and Nickel Oxide for Increased Activity," 3 pgs.

Young, Lee W., Authorized Officer of the International Searching Authority, International Search Report and Written Opinion mailed Apr. 6, 2011, for PCT Application No. PCT/US 10/59761, 9 pgs.

Bateman, James E. et al., "Alkylation of Porous Silicon by Direct Reaction with Alkenes and Alkynes," Angew. Chem Int. Ed., Dec. 17, 1998, 37, No. 19, pp. 2683-2685.

Langner Alexander et al., "Controlled Silicon Surface Functionalization by Alkene Hydrosilylation," J. Am. Chem. Soc., Aug. 25, 2005, 127, pp. 12798-12799.

Liu, Shu-Man et al., "Enhanced Photoluminescence from Si Nano-organosols by Functionalization with Alkenes and Their Size Evolution," Chem. Mater., Jan. 13, 2006, 18,pp. 637-642.

Fojtik, Anton, "Surface Chemistry of Luminescent Colloidal Silicon Nanoparticles," J. Phys. Chem. B., Jan. 13, 2006, pp. 1994-1998.

Li, Dejin et al., "Environmentally Responsive "Hairy" Nanoparticles: Mixed Homopolymer Brushes on Silica Nanoparticles Synthesized by Living Radical Polymerization Techniques," J.Am. Chem. Soc., Apr. 9, 2005, 127,pp. 6248-6256.

Neiner, Doinita, "Low-Temperature Solution Route to Macroscopic Amounts of Hydrogen Terminated Silicon Nanoparticles," J. Am. Chem. Soc., Aug. 5, 2006, 128, pp. 11016-11017.

Fojtik, Anton et al., "Luminescent Colloidal Silicon Particles," Chemical Physics Letters 221, Apr. 29, 1994, pp. 363-367.

Netzer, Lucy et al., "A New Approach to Construction of Artificial Monolayer Assemblies," J. Am. Chem. Soc., 1983, 105, pp. 674-676.

Chen, H.-S. et al., "On the Photoluminescence of Si Nanoparticles," Mater. Phys. Mech. 4, Jul. 3, 2001, pp. 62-66.

Kwon, Young-Soon et al., "Passivation Process for Superfine Aluminum Powders Obtained by Electrical Explosion of Wires," Applied Surface Science 211, Apr. 30, 2003, pp. 57-67.

(56) References Cited

OTHER PUBLICATIONS

Liao, Ying-Chih et al., "Self-Assembly of Organic Monolayers on Aerosolized Silicon Nanoparticles," J.Am. Chem. Soc., Jun. 27, 2006, 128, pp. 9061-9065.

Zou, Jing et al., "Solution Synthesis of Ultrastable Luminescent Siloxane-Coated Silicon Nanoparticles," Nano Letters, Jun. 4, 2004, vol. 4, No. 7, pp. 1181-1186.

Tao, Yu-Tai, "Structural Comparison of Self-Assembled Monolayers of n-Alkanoic Acids on the surfaces of Silver, Copper, and Aluminum," J. Am. Chem. Soc., May 1993, 115, pp. 4350-4358.

Sailor, Michael et al., "Surface Chemistry of Luminescent Silicon Nanocrystallites," Adv. Mater, 1997, 9, No. 10, pp. 783-793.

Li, Xuegeng et al., "Surface Functionalization of Silicon Nanoparticles Produced by Laser-Driven Pyrolysis of Silane Followed by HF-HNO3 Etching," Langmuir, May 25, 2004, pp. 4720-4727.

Carrot, Geraldine et al., "Surface-Initiated Ring-Opening Polymerization: A Versatile Method for Nanoparticle Ordering," Macromolecules, Sep. 17, 2002, 35, pp. 8400-8404.

Jouet, R. Jason et al., "Surface Passivation of Bare Aluminum Nanoparticles Using Perfluoroalkyl Carboxylic Acids," Chem. Mater., Jan. 25, 2005, 17, pp. 2987-2996.

Yoshida, Toyonobu, "The Future of Thermal Plasma Processing for Coating," Pure & Appl. Chem., vol. 66, No. 6, 1994, pp. 1223-1230.

Kim, Namyong Y. et al., "Thermal Derivatization of Porous Silicon with Alcohols," J. Am. Chem. Soc., Mar. 5, 1997. 119, pp. 2297-2298.

Hua, Fengjun et al., "Organically Capped Silicon Nanoparticles with Blue Photoluminescence Prepared by Hydrosilylation Followed by Oxidation," Langmuir, Mar. 2006, pp. 4363-4370.

Stiles, A.B., Catalyst Supports and Supported Catalysts, Manufacture of Carbon-Supported Metal Catalysts, pp. 125-132, published Jan. 1, 1987, Butterworth Publishers, 80 Montvale Ave., Stoneham, MA 02180.

Ji, Y. et al. (Nov. 2002) "Processing and Mechanical Properties of $Al_2O_3$-5 vol.% Cr Nanocomposites," *Journal of the European Ceramic Society* 22(12):1927-1936.

"Platinum Group Metals: Annual Review 1996" (Oct. 1997). Engineering and Mining Journal, p. 63.

Rahaman, R. A. et al. (1995). "Synthesis of Powders," In *Ceramic Processing and Sintering*. Marcel Decker, Inc., New York, pp. 71-77.

Ünal, N. et al. (Nov. 2011). "Influence of WC Particles on the Microstructural and Mechanical Properties of 3 mol% $Y_2O_3$ Stabilized $ZrO_2$ Matrix Composites Produced by Hot Pressing," Journal of the European Ceramic Society (31)13: 2267-2275.

U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,248, filed Dec. 14, 2010, for Biberger.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.
U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
U.S. Appl. No. 13/033,514, filed Feb. 23, 2011, for Biberger et al.
Non-Final Office Action mailed Nov. 8, 2012, for U.S. Appl. No. 12/968,245, filed Dec. 14, 2010, for Biberger et al.; 13 pages.
Non-Final Office Action mailed Nov. 8, 2012, for U.S. Appl. No. 12/968,253, filed Dec. 14, 2010, for Biberger et al., 13 pages.

\* cited by examiner

METHOD OF FORMING A CATALYST WITH INHIBITED MOBILITY OF NANO-ACTIVE MATERIAL

CROSS-REFERENCE TO RELATED APPLICATIONS

This application claims priority to U.S. Provisional Patent Application Ser. No. 61/284,329, filed Dec. 15, 2009 and entitled "MATERIALS PROCESSING," which is hereby incorporated herein by reference in its entirety as if set forth herein.

FIELD OF THE INVENTION

The present invention relates to the field of catalysts. More specifically, the present invention relates to a method of forming catalysts where the mobility of the active catalytic particles is inhibited.

BACKGROUND OF THE INVENTION

Catalysts are used to facilitate and speed up reactions. In some applications, it is desirable to utilize small-scale catalyst material, such as catalytic nano-sized particles. Furthermore, it is also oftentimes desirable to use support structures to provide a substructure upon which the catalytic particles can reside.

Figure 1A:
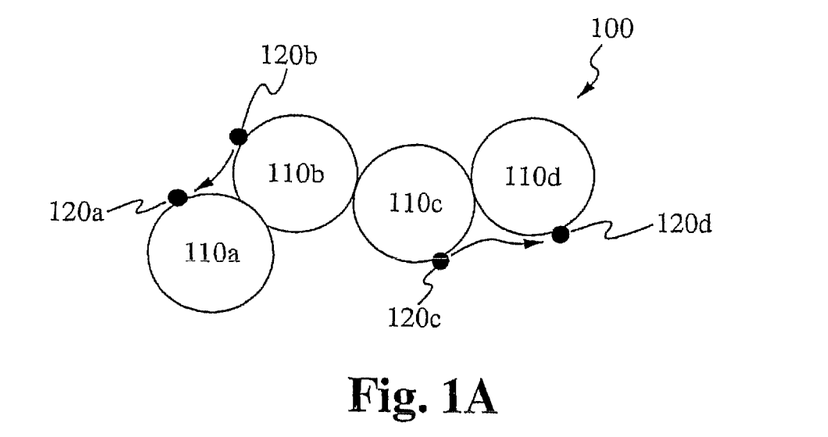
FIGS. 1A-C illustrate one embodiment of a catalyst susceptible to the movement and coalescence of its catalytic particles.
Figure 1B:
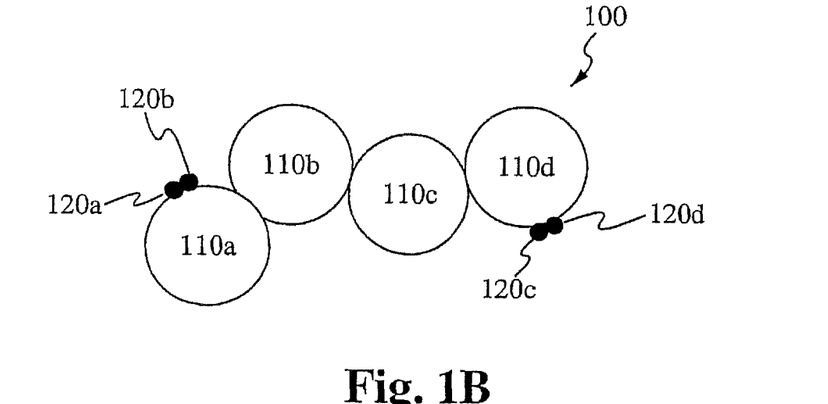
Figure 1C:
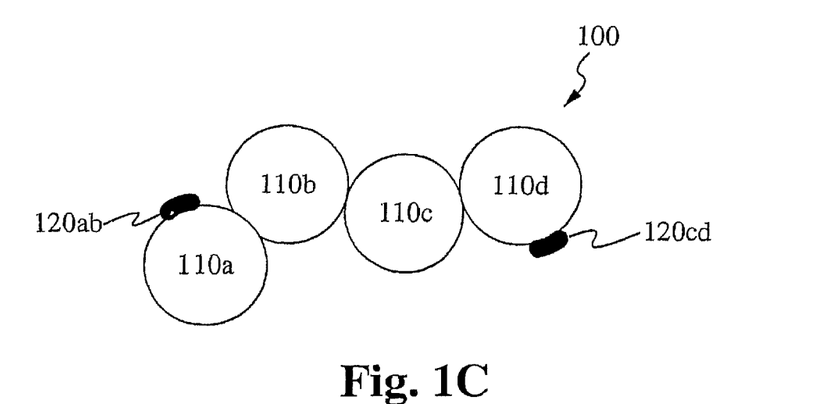

In FIG. 1A, catalyst 100 comprises a plurality of support particles 110a-d, each having at least one corresponding catalytic particle 120a-d. Although FIGS. 1A-C show only four support particles 110, it is contemplated that the catalyst 100 can comprise any number of support particles 110. The catalytic particles 120a-d can be chemically absorbed or bonded onto the surface of the support particles 110a-d. However, the catalytic particles 120a-d are not permanently fixed to their bonded support particles 110a-d. Rather, they are able to move from one support particle 110 to another. For example, FIGS. 1A-B show catalytic particles 120b and 120c moving from their respective support particles 110b and 110c to adjacent support particles 110a and 110d, respectively, such that catalytic particles 120a and 120b are disposed on support particle 110a and catalytic particles 120c and 120d are disposed on support particle 110d. In high temperature applications, the movement of these catalytic particles is magnified. As seen in FIG. 1C, as catalytic particles 120b and 120c move to neighboring support particles 110a and 110d, they begin to coalesce with other catalytic particles 120a and 120d on those neighboring support particles, resulting in larger catalytic particles 120ab and 120cd.

It is understood that the effectiveness and activity of a catalyst are directly proportional to the size of the catalytic particles on the surface of the support particles. As the catalytic particles coalesce into larger clumps, the catalytic particle sizes increase, the surface area of the catalytic particles decreases, and the effectiveness of the catalyst is detrimentally affected.

SUMMARY OF THE INVENTION

The present invention inhibits this movement of catalytic particles and reduces their coalescence, thereby minimizing their individual size and maximizing their combined surface area. The present invention achieves these results by providing one or more mobility-inhibiting particles between the support particles in order to prevent the catalytic particles from moving from one support particles to another.

In one aspect of the present invention, a method of forming a catalyst is provided. The method comprises providing a plurality of support particles and a plurality of mobility-inhibiting particles. Each support particle in the plurality of support particles is bonded with its own catalytic particle. The plurality of mobility-inhibiting particles is then bonded to the plurality of support particles. Each support particle is separated from every other support particle in the plurality of support particles by at least one of the mobility-inhibiting particles. The mobility-inhibiting particles are configured to prevent the catalytic particles from moving from one support particle to another support particle.

In another aspect of the present invention, a method of forming a catalyst is provided. The method comprises providing a plurality of support particles and a plurality of mobility-inhibiting particles. Each support particle in the plurality of support particles is bonded with its own catalytic particle. The plurality of support particles is dispersed in a dispersion liquid, thereby forming a dispersion of support particles. The plurality of mobility-inhibiting particles is dispersed in a dispersion liquid, thereby forming a dispersion of mobility-inhibiting particles. The dispersion of support particles is mixed with the dispersion of mobility-inhibiting particles, thereby forming a wet mixture. The wet mixture is freeze-dried, thereby forming a dried mixture. The dried mixture is then calcined, thereby forming a cluster of the plurality of support particles and the plurality of mobility-inhibiting particles. Each support particle is separated from every other support particle in the plurality of support particles by at least one of the mobility-inhibiting particles. The mobility-inhibiting particles are configured to prevent the catalytic particles from moving from one support particle to another support particle.

In yet another aspect of the present invention, a catalyst is provided. The catalyst comprises a plurality of support particles. Each support particle in the plurality of support particles is bonded with its own catalytic particle. The catalyst also comprises a plurality of mobility-inhibiting particles bonded to the plurality of support particles. Each support particle is separated from every other support particle in the plurality of support particles by at least one of the mobility-inhibiting particles. The mobility-inhibiting particles are configured to prevent the catalytic particles from moving from one support particle to another support particle.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This disclosure refers to both particles and powders. These two terms are equivalent, except for the caveat that a singular "powder" refers to a collection of particles. The present invention may apply to a wide variety of powders and particles. Powders that fall within the scope of the present invention may include, but are not limited to, any of the following: (a) nano-structured powders (nano-powders), having an average grain size less than 250 nanometers and an aspect ratio between one and one million; (b) submicron powders, having an average grain size less than 1 micron and an aspect ratio between one and one million; (c) ultra-fine powders, having an average grain size less than 100 microns and an aspect ratio between one and one million; and (d) fine powders, having an average grain size less than 500 microns and an aspect ratio between one and one million.

Figure 2:
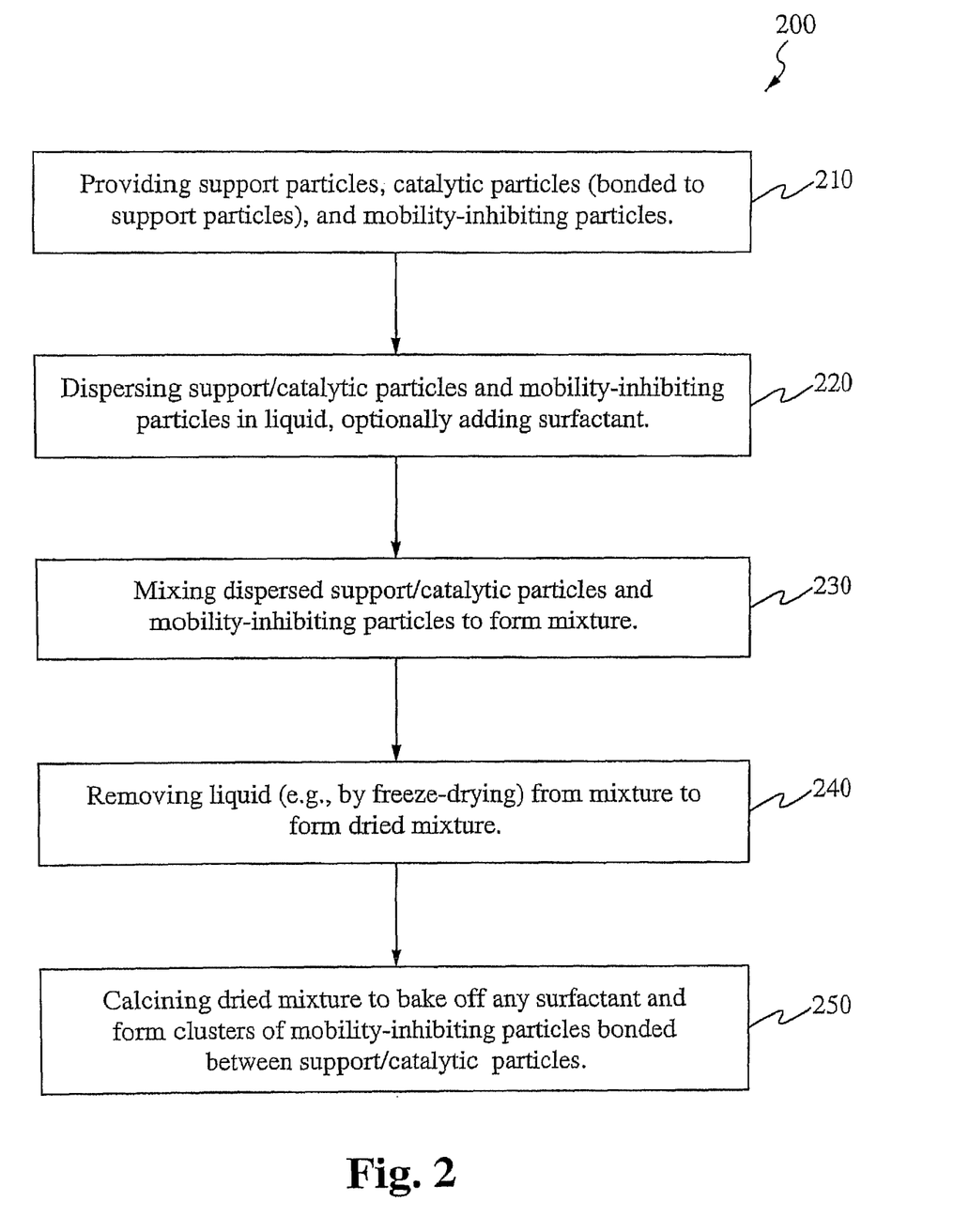
FIG. 2 is a flow chart illustrating one embodiment of a method of forming a catalyst in accordance with the principles of the present invention.

FIG. 2 is a flow chart illustrating one embodiment of a method 200 of forming a catalyst in accordance with the principles of the present invention.

At step 210, a plurality of support particles and mobility-inhibiting particles are provided. Preferably, each support particle is bonded with its own distinct catalytic particle (i.e., a one-to-one ratio between the support particles and the catalytic particles). However, it is contemplated that some support particles can be free of any catalytic particles. The term "support/catalytic particle" is used in this disclosure to refer to a support particle and the catalytic particle bonded to it. The mobility-inhibiting particles are configured to prevent the catalytic particles from moving from one support particle to another support particle. In a preferred embodiment, the mobility-inhibiting particles comprise one or more materials that the catalytic particles do not like to travel to or on, thereby reducing the mobility of the catalytic particles.

In a preferred embodiment, the support particles have a non-catalytic composition, in contrast to the catalytic particles. In this respect, the support particles ideally have a different chemical composition than that of the catalytic particles. Similarly, the mobility-inhibiting particles preferably have a non-catalytic chemical composition that is different from that of both the support particles and the catalytic particles. However, it is contemplated that the particle chemical compositions can vary from embodiment to embodiment. In an exemplary embodiment, the support particles comprise or consist of aluminum oxide and the catalytic particles comprise or consist of a platinum group metal, such as platinum, ruthenium, rhodium, palladium, osmium, or iridium. In some embodiments, the mobility-inhibiting particles comprise or consist of a metal oxide (preferably, a transition metal oxide), including, but not limited to, cerium oxide, lanthanum oxide, and titanium oxide. In other embodiments, the mobility-inhibiting particles comprise or consist of a glass or a ceramic, including, but not limited to, boron nitride, titanium carbide, and titanium diboride. Preferably, the mobility-inhibiting particles do not comprise any precious metals.

In a preferred embodiment, the support particles, the catalyst particles, and the mobility-inhibiting particles are nanoparticles. Preferably, the support particles and the mobility-inhibiting particles have a maximum diameter of 500 nanometers and a minimum diameter of 1-5 nanometers, while the catalyst particles have a diameter in the range of 0.5-5 nanometers. In some embodiments, the diameter of the support particles and the mobility-inhibiting particles is in the range of 10-15 nanometers and the diameter of the catalyst particles is in the range of 2-5 nanometers. However, it is contemplated that other particle sizes can be employed.

It is contemplated that the nano-scale structure of the particles can be achieved in a variety of ways. In a preferred embodiment, the support particles and the catalytic particles are vaporized in the hottest region of a plasma gun. The vaporized particles are then subjected to rapid quenching, causing them to condense. As a result of this vaporization and condensation, nano-sized support particles are formed with nano-sized catalytic particles bonded to them.

Examples of particle production systems employing plasma reactors to produce nano-sized particles are disclosed in U.S. patent application Ser. No. 12/151,935, filed on May 8, 2008 and entitled, "HIGHLY TURBULENT QUENCH CHAMBER", the entirety of which is hereby incorporated by reference as if set forth herein. One such particle production system 300 is presented in FIG. 3. The system 300 comprises a precursor supply device 310 and a working gas supply device 320 both fluidly coupled to a plasma production chamber 330 having an energy delivery zone 335 formed therein. The plasma production chamber 330 is fluidly coupled with an injection port 340 of a constricting quench chamber 345, thereby allowing the energy delivery zone 335 to fluidly communicate with the quench chamber 345. One or more ports 390 also allow fluid communication of the quench chamber 345 with a controlled atmosphere system 370 (indicated by the dotted lines). The quench chamber 345 is also fluidly coupled with an ejection port 365.

Figure 3:
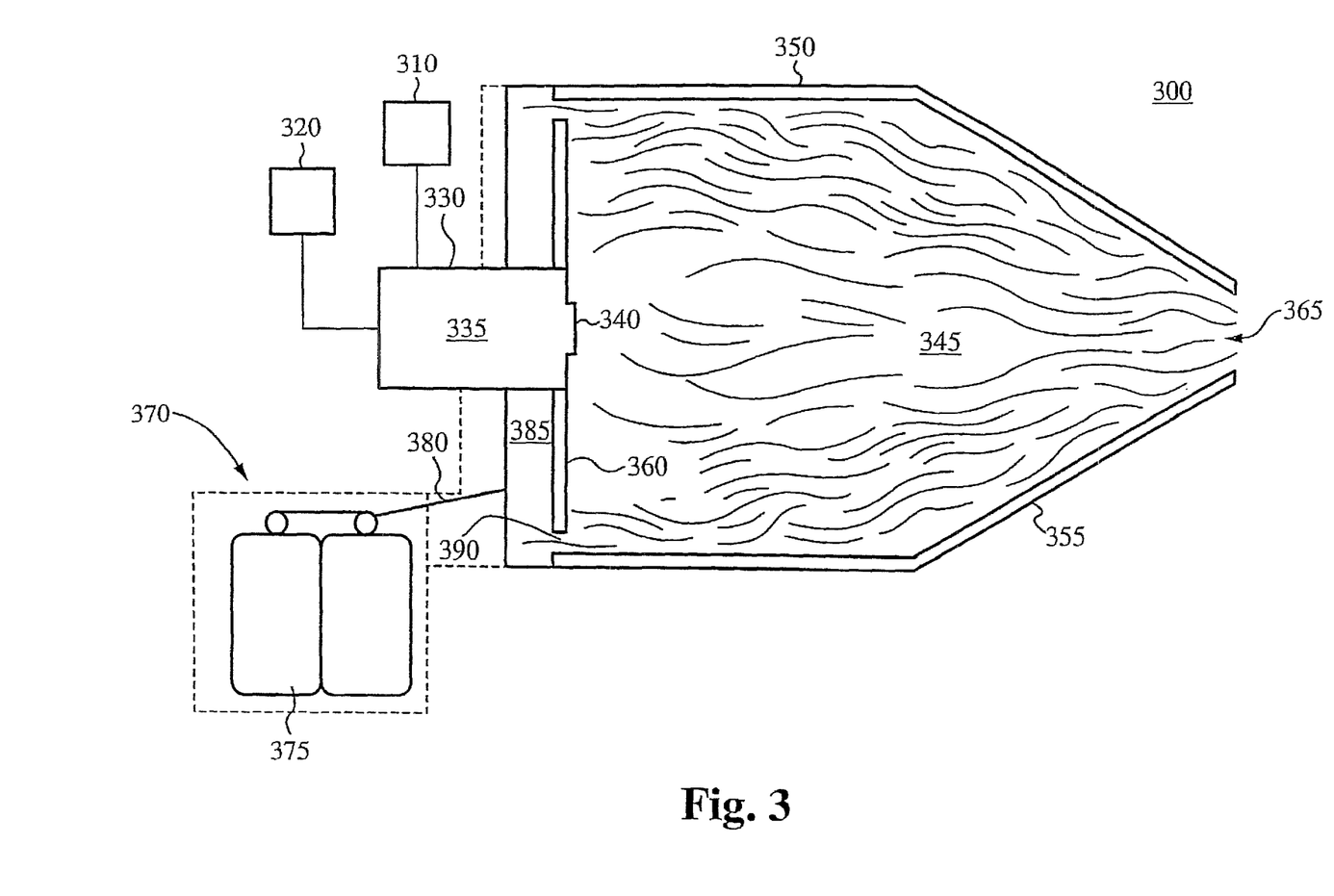
FIG. 3 illustrates one embodiment of a particle production system in accordance with the principles of the present invention.

Generally, the plasma production chamber 330 operates as a reactor, producing an output comprising particles within a gas stream. Particle production includes the steps of combination, reaction, and conditioning. Working gas is supplied from a gas source to a plasma reactor. Within the plasma reactor, energy is delivered to the working gas, thereby creating a plasma. A variety of different means can be employed to deliver this energy, including, but not limited to, DC coupling, capacitive coupling, inductive coupling, and resonant coupling. One or more material dispensing devices introduce at least one material, preferably in powder form, into the plasma reactor. The combination within the plasma reactor of the plasma and the material(s) introduced by the material dispensing device(s) forms a highly reactive and energetic mixture, wherein the powder can be vaporized. This mixture of vaporized powder moves through the plasma reactor in the flow direction of the working gas. As it moves, the mixture cools and particles are formed therein. The still-energetic output mixture, comprising hot gas and energetic particles, is emitted from the plasma reactor.

In an exemplary embodiment, the plasma production chamber 330 combines precursor material (preferably in powder form) supplied from the precursor supply device 310 and working gas supplied from the working gas supply device 320 within the energy delivery zone 335, where the working gas is energized to form a plasma. The plasma is applied to the precursor material within the energy delivery zone 335 to form an energized, reactive mixture. This mixture comprises one or more materials in at least one of a plurality of phases, which may include vapor, gas, and plasma.

The reactive mixture flows from the energy delivery zone 335 into the constricting quench chamber 345 through the injection port 340. As the hot mixture moves from the energy delivery zone 335, it expands rapidly within the quench chamber 345 and cools. While the mixture flows into the quench chamber 345, the ports 390 supply conditioning fluid along the inner surfaces of the quench chamber 345. The conditioning fluid combines, at least to some extent, with the mixture, and flows from the quench chamber 345 through the ejection port 365.

During a period immediately after entering the quench chamber 345, particle formation occurs. Furthermore, the supply of conditioning fluid along the inner surfaces of the quench chamber 345 works to condition the reactive mixture, to maintain entrainment of the particles therein, and to prevent the depositing of material on the inner surfaces of the quench chamber 345.

Still referring to FIG. 3, the structure of the quench chamber 345 can be formed of relatively thin walled components capable of dissipating substantial heat. For example, the thin-walled components can conduct heat from inside the chamber and radiate the heat to the ambient. The quench chamber 345 comprises a substantially cylindrical surface 350, a cone-like (frusto-conical) surface 355, and an annular surface 360 connecting the injection port 340 with the cylindrical surface 350. The cylindrical surface 350, having a large diameter relative to the size of the injection port 340, provides accommodation for the expansion of the reactive mixture that occurs after the mixture flows into the quench chamber 345. The cone-like surface 355 extends from the cylindrical surface 350, away from the injection port 340 and towards the ejection port 365. The cone-like surface 355 is sufficiently smoothly varying so as to not unduly compress fluid flowing from through the quench chamber 345 to the ejection port 365.

Substantial heat is emitted, mostly in the form of radiation, from the mixture following its entry into the quench chamber 345. The quench chamber 345 is preferably designed to dissipate this heat efficiently. For example, the surfaces of the quench chamber 345 are preferably exposed to a cooling apparatus (not shown).

Still referring to FIG. 3, the controlled atmosphere system 370 preferably comprises a chamber 385 into which conditioning fluid is introduced from a reservoir 375 through a conduit 380. The conditioning fluid preferably comprises argon. However, other inert, relatively heavy gases are equally preferred. Furthermore, the preferable mechanism of providing the conditioning fluid into the quench chamber 345 is the formation of a pressure differential between the quench chamber 345 and the outlet 365. Such pressure differential will draw the conditioning fluid into the quench chamber 345 through the ports 390. Other less preferred methods of providing the conditioning fluid include, but are not limited to, forming positive pressure within the chamber 385.

The frusto-conical shape of the quench chamber 345 can provide a modest amount of turbulence within the quench region, thereby promoting the mixing of the conditioning fluid with the reactive mixture, and increasing the quenching rate beyond prior art systems. However, in some situations, an even greater increase in quenching rate may be desired. Such an increase in quenching rate can be achieved by creating a highly turbulent flow within a region of a quench chamber where the conditioning fluid is mixed with the reactive mixture.

Figure 4:
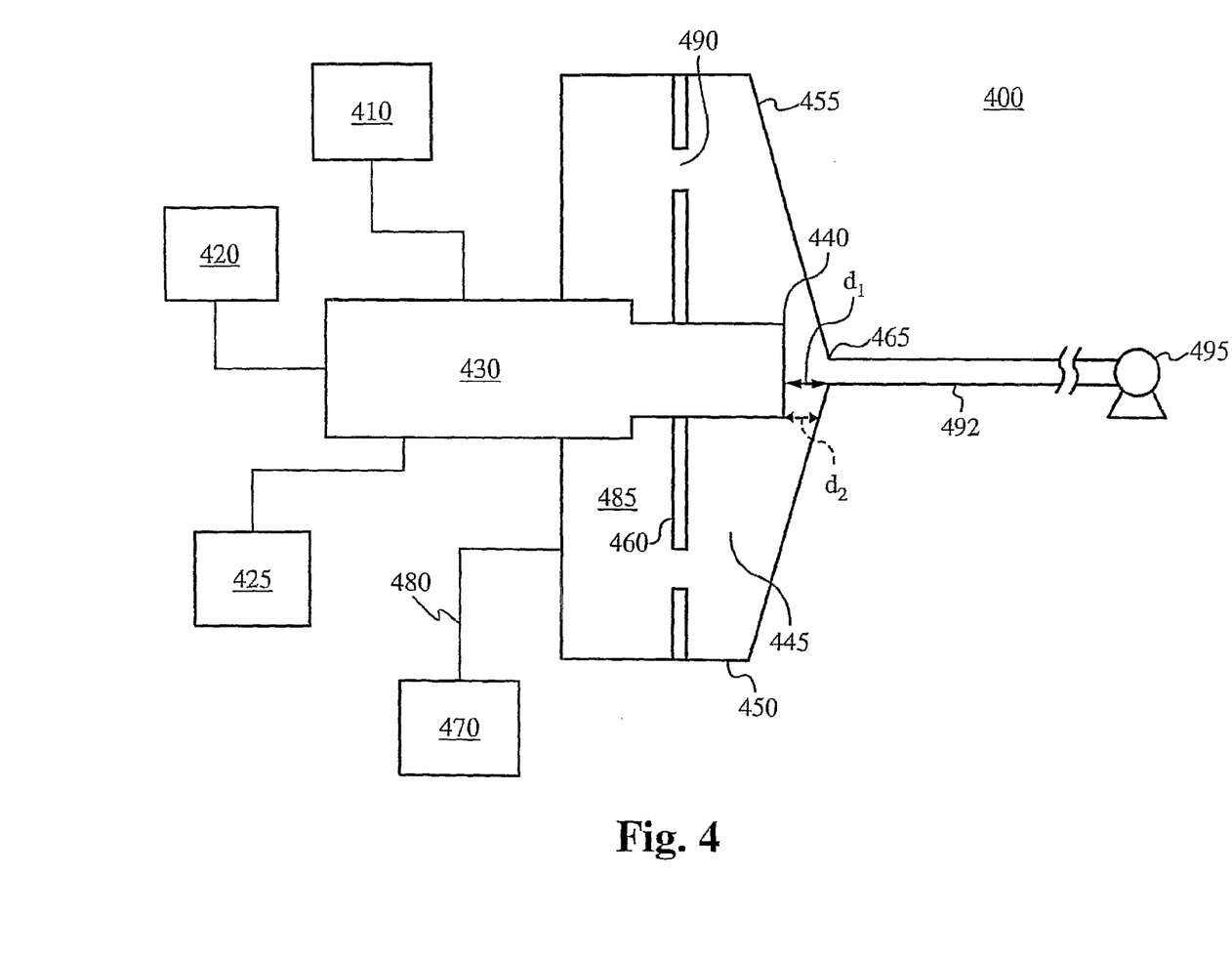
FIG. 4 illustrates another embodiment of a particle production system in accordance with the principles of the present invention.

FIG. 4 illustrates a particle production system 400 with a highly turbulent quench chamber 445. The system 400 comprises a precursor supply device 410 a working gas supply device 420 fluidly coupled to a plasma production and reaction chamber 430, similar to plasma production chamber 330 discussed above with reference to FIG. 3. An energy delivery system 425 is also coupled with the plasma production and reactor chamber 430. The plasma production and reactor chamber 430 includes an injection port 440 that communicates fluidly with the constricting quench chamber 445. One or more ports 490 can also allow fluid communication between the quench chamber 445 and a controlled atmosphere system 470, similar to controlled atmosphere system 370 in FIG. 3. The quench chamber 445 is also fluidly coupled to an outlet 465.

Generally, the chamber 430 operates as a reactor, similar to chamber 330 in FIG. 3, producing an output comprising particles within a gas stream. Production includes the basic steps of combination, reaction, and conditioning as described later herein. The system combines precursor material supplied from the precursor supply device 410 and working gas supplied from the working gas supply device 420 within the energy delivery zone of the chamber 430. The system energizes the working gas in the chamber 430 using energy from the energy supply system 490, thereby forming a plasma. The plasma is applied to the precursor material within the chamber 430 to form an energized, reactive mixture. This mixture comprises one or more materials in at least one of a plurality of phases, which may include vapor, gas, and plasma. The reactive mixture flows from the plasma production and reactor chamber 430 into the quench chamber 445 through an injection port 440.

The quench chamber 445 preferably comprises a substantially cylindrical surface 450, a frusto-conical surface 455, and an annular surface 460 connecting the injection port 440 with the cylindrical surface 450. The frusto-conical surface 460 narrows to meet the outlet 465. The plasma production and reactor chamber 430 includes an extended portion at the end of which the injection port 440 is disposed. This extended portion shortens the distance between the injection port 440 and the outlet 465, reducing the volume of region in which the reactive mixture and the conditioning fluid will mix, referred to as the quench region. In a preferred embodiment, the injection port 440 is arranged coaxially with the outlet 465. The center of the injection port is positioned a first distance $d_1$ from the outlet 465. The perimeter of the injection port is positioned a second distance $d_2$ from a portion of the frusto-conical surface 455. The injection port 440 and the frusto-conical surface 455 form the aforementioned quench region therebetween. The space between the perimeter of the injection port 440 and the frusto-conical surface 455 forms a gap therebetween that acts as a channel for supplying conditioning fluid into the quench region. The frusto-conical surface 455 acts as a funneling surface, channeling fluid through the gap and into the quench region.

While the reactive mixture flows into the quench chamber 445, the ports 490 supply conditioning fluid into the quench chamber 445. The conditioning fluid then moves along the frusto-conical surface 455, through the gap between the injection port 440 and the frusto-conical surface 455, and into the quench region. In some embodiments, the controlled atmosphere system 470 is configured to control the volume flow rate or mass flow rate of the conditioning fluid supplied to the quench region.

As the reactive mixture moves out of the injection port 440, it expands and mixes with the conditioning fluid. Preferably, the angle at which the conditioning fluid is supplied produces a high degree of turbulence and promotes mixing with the reactive mixture. This turbulence can depend on many parameters. In a preferred embodiment, one or more of these parameters is adjustable to control the level of turbulence. These factors include the flow rates of the conditioning fluid, the temperature of the frusto-conical surface 455, the angle of the frusto-conical surface 455 (which affects the angle at which the conditioning fluid is supplied into the quench region), and the size of the quench region. For example, the relative positioning of the frusto-conical surface 455 and the injection port 440 is adjustable, which can be used to adjust the volume of quench region. These adjustments can be made in a variety of different ways, using a variety of different mechanisms, including, but not limited to, automated means and manual means.

During a brief period immediately after entering the quench chamber 445, particle formation occurs. The degree to which the particles agglomerate depends on the rate of cooling. The cooling rate depends on the turbulence of the flow within the quench region. Preferably, the system is adjusted to form a highly turbulent flow, and to form very dispersed particles. For example, in preferred embodiments, the turbidity of the flow within the quench region is such that the flow has a Reynolds Number of at least 1000.

Still referring to FIG. 4, the structure of the quench chamber 445 is preferably formed of relatively thin walled components capable of dissipating substantial quantities of heat. For example, the thin-walled components can conduct heat from inside the chamber and radiate the heat to the ambient.

Substantial heat is emitted, mostly in the form of radiation, from the reactive mixture following its entry into the quench chamber 445. The quench chamber 445 is designed to dissipate this heat efficiently. The surfaces of the quench chamber 245 are preferably exposed to a cooling system (not shown). In a preferred embodiment, the cooling system is configured to control a temperature of the frusto-conical surface 455.

Following injection into the quench region, cooling, and particle formation, the mixture flows from the quench chamber 445 through the outlet port 465. Suction generated by a generator 495 moves the mixture and conditioning fluid from the quench region into the conduit 492. From the outlet port 465, the mixture flows along the conduit 492, toward the suction generator 495. Preferably, the particles are removed from the mixture by a collection or sampling system (not shown) prior to encountering the suction generator 495.

Still referring to FIG. 4, the controlled atmosphere system 470 comprises a chamber 485, fluidly coupled to the quench region through port(s) 490, into which conditioning fluid is introduced from a reservoir, such as reservoir 375 from FIG. 3, through a conduit 480. As described above, the conditioning fluid preferably comprises argon. However, other inert, relatively heavy gases are equally preferred. Also, as discussed above, the preferable mechanism of providing the conditioning fluid into the quench chamber 445 is the formation of a pressure differential between the quench chamber 445 and the outlet 465. Such pressure differential will draw the conditioning fluid into the quench chamber 445 through the ports 490. Other methods of providing the conditioning fluid include, but are not limited to, forming positive pressure within the chamber 485.

The angle of the frusto-conical surface affects the angle at which the conditioning fluid is supplied into the quench region, which can affect the level of turbulence in the quench region. The conditioning fluid preferably flows into the quench region along a plurality of momentum vectors. The greater the degree of the angle between the momentum vectors, the higher the level of turbulence that will be produced. In a preferred embodiment, the high turbulent quench chamber comprises a frusto-conical surface that is configured to funnel at least two conditioning fluid momentum vectors into the quench region such that there is at least a 90 degree angle between the two momentum vectors. It is contemplated that other angle degree thresholds may be applied as well. For example, attention may also be paid to the angle formed between at least one of the conditioning fluid momentum vectors and the momentum vector of the reactive mixture. In one embodiment of a highly turbulent quench chamber, a reactive mixture inlet is configured to supply the reactive mixture into the quench region along a first momentum vector, the frusto-conical surface is configured to supply the conditioning fluid to the quench region along a second momentum vector, and the second momentum vector has an oblique angle greater than 20 degrees relative to the first momentum vector.

The size of the quench region also affects the level of turbulence in the quench region. The smaller the quench region, the higher the level of turbulence that will be produced. The size of the quench region can be reduced by reducing the distance between the center of the injection port 440 and the outlet 465.

The high turbulence produced by the embodiments of the present invention decreases the period during which particles formed can agglomerate with one another, thereby producing particles of more uniform size, and in some instances, producing smaller-sized particles. Both of these features lead to particles with increased dispersibility and increased ratio of surface area to volume.

Referring back to the method 200 in FIG. 2, particle production system 200 or 300 (or variations thereof) can be used to provide one or more of the support particles, catalytic particles, and mobility-inhibiting particles in nano-scale form. For example, these particles can be introduced as micron-sized precursor material into the particle production system, where they are vaporized and then condensed to form nano-size particles. In a preferred embodiment, the support/catalytic particles are formed and provided separately from the mobility-inhibiting particles, thereby avoiding any premature interaction (e.g., bonding) between the mobility-inhibiting particles and the support/catalytic particles. Such separation can be achieved in a variety of ways, including, but not limited to, using different particle production systems for both groups, or by using the same particle production system for both groups at different times.

Figure 5A:
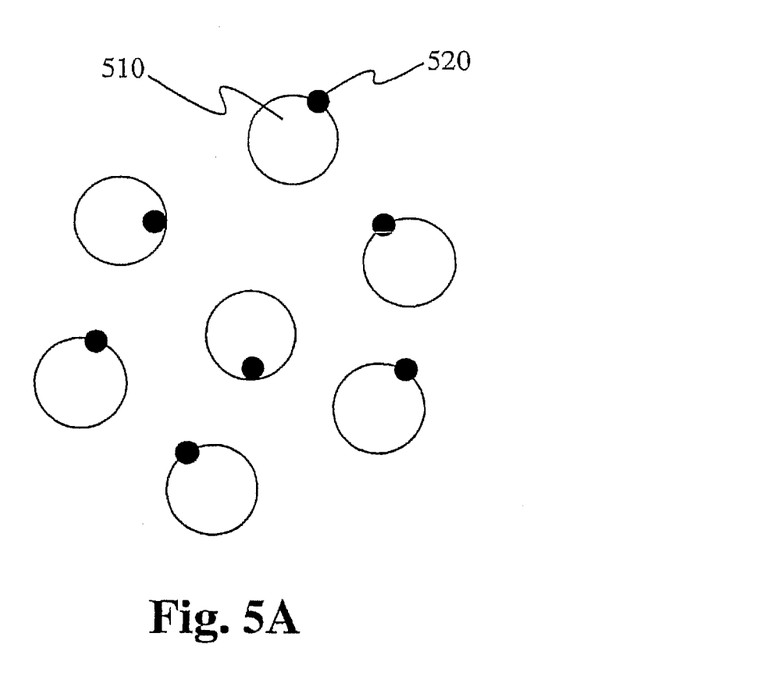
FIG. 5A illustrates one embodiment of a plurality of support particles with their associated catalytic particles in accordance with the principles of the present invention.

FIG. 5A illustrates one embodiment of a plurality of support particles 510 provided in step 210 of method 200. Each support particle 510 has a catalytic particle 520 bonded to it (preferably to its exterior surface). Although, in some embodiments, certain support particles 510 may be absent a catalytic particle 520. It is contemplated that the size of the catalytic particle 520 on the support particle 510 can be affected by changing the amount of catalytic material provided to the particle production system or by otherwise adjusting the mix ratio of catalytic particles to support particles provided to the particle production system. The larger the concentration of catalytic particles provided to the particle production system, the larger the size of the catalytic particles 520 bonded to the support particles 510.

Figure 5B:
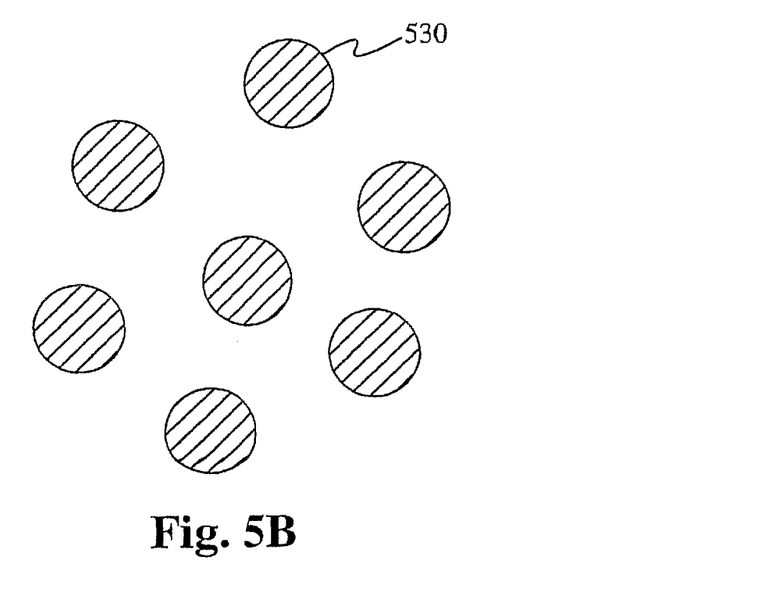
FIG. 5B illustrates one embodiment of a plurality of mobility-inhibiting particles in accordance with the principles of the present invention.

FIG. 5B illustrates one embodiment of a plurality of mobility-inhibiting particles 530 provided in step 210 of method 200. The stripes on the mobility-inhibiting particles 530 are provided solely for the purpose of helping to distinguish the mobility-inhibiting particles 530 from the support particles 510.

Figure 6A:
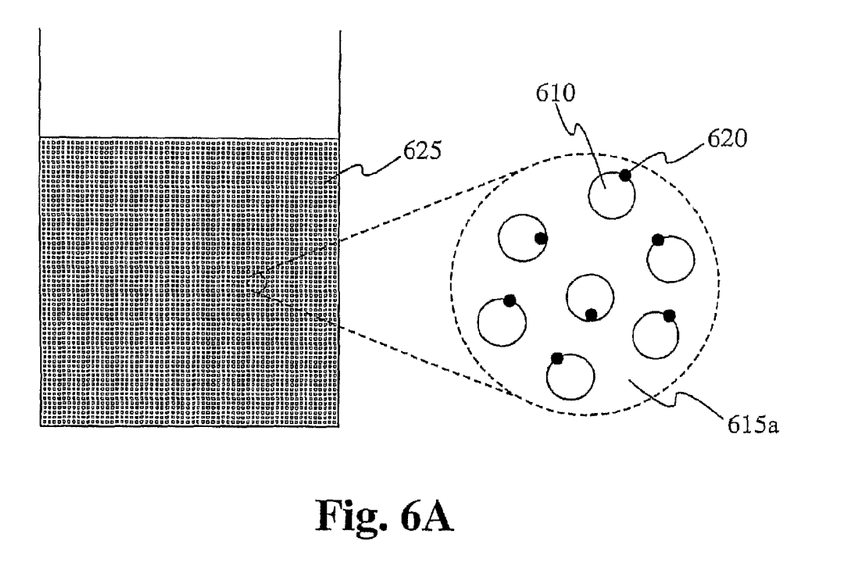
FIG. 6A illustrates one embodiment of a dispersion of support particles with their associated catalytic particles in accordance with the principles of the present invention.
Figure 6B:
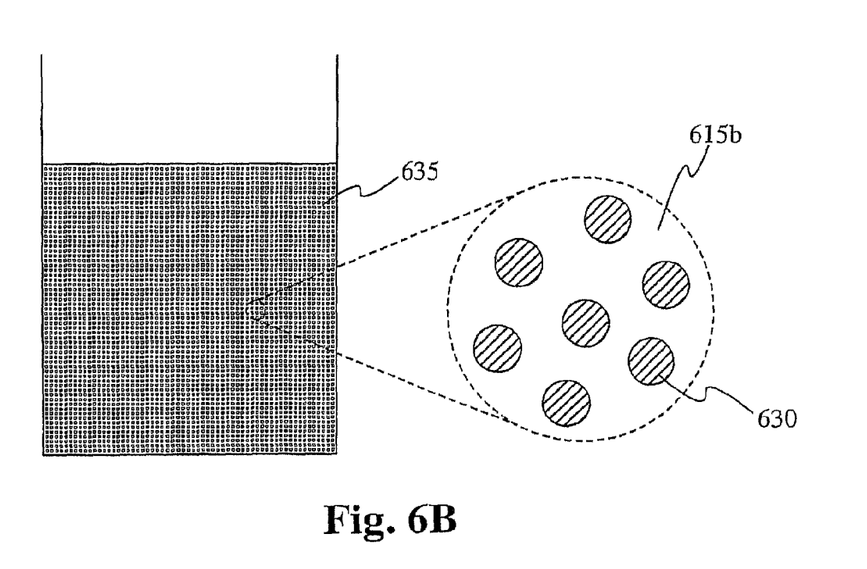
FIG. 6B illustrates one embodiment of a dispersion of mobility-inhibiting particles in accordance with the principles of the present invention.

At step 220 of method 200, the support/catalytic particles and the mobility-inhibiting particles are dispersed in liquid. FIG. 6A illustrates one embodiment of a dispersion 625 of support/catalytic particles. A close-up of the dispersion 625 shows the support/catalytic particles being separated by a liquid 615a and being made up of support particles 610 having catalytic particles 620 bonded to them. FIG. 6B illustrates one embodiment of a dispersion 635 of mobility-inhibiting particles 630. A close-up of the dispersion 635 shows the mobility-inhibiting particles 630 being separated by a liquid 615b. Although FIGS. 6A-B show the support/catalytic particles and the mobility-inhibiting particles in separate dispersions 625 and 635, it is contemplated that they can also be dispersed in the same container at the same time to form one dispersion.

The dispersion liquids 615a and 615b can be any liquids configured to disperse the support/catalytic particles and the mobility-inhibiting particles, respectively. In a preferred embodiment, the dispersion liquids comprise or consist of water or any organic liquid, such as glycol ethers. In some embodiments, dispersions 625 and 635 both use the same type of dispersion liquid. In other embodiments, dispersions 625 and 635 use different types of dispersion liquids (e.g., dispersion liquid 615a is water and dispersion liquid 615b is ethylene glycol).

In some embodiments, one or more surfactants or other dispersing aids, such as cationic, anionic, zwitterionic, and/or non-ionic carbon based oligomers and/or polymers, can be added to the dispersion liquid. Certain surfactants can be added to the dispersion in order to adjust its acidity and make it stable. Acids can be added to the dispersion in order to acidify the surface of N-oxide particles. The surfactants are carefully chosen so that they will not be harmful to the catalyst material. In preferred embodiments, no sulfates or phosphates are added to the dispersion. Examples of surfactants that can be added to the dispersion liquid are carboxylic acids, polyamines, and polyethers. It is contemplated that other surfactants or dispersing aids can be used as well.

It is contemplated that the different variations of particle, dispersion liquid, and surfactant concentrations can be employed. In a preferred embodiment, the dispersion comprises a 5-25% by weight concentration of powder, meaning that the support/catalytic particles and the mobility-inhibiting particles each make up approximately 5-25% by weight of their respective dispersions. In a preferred embodiment, the dispersion comprises a 1-10% by weight concentration of surfactant or other dispersing aid. Preferably, the surfactant or other dispersing aid accounts for approximately 5% or less of the dispersion.

At step 230 of method 200, the dispersed support/catalytic particles and mobility-inhibiting particles are mixed to form a mixture. If the support/catalytic particles and the mobility-inhibiting particles were not originally dispersed together, or not subsequently placed into the same container to form a single dispersion, then they are at this time placed into the same container where they can be mixed together. In a preferred embodiment, the mixing is performed by sonication, mechanical mixing, and/or shear mixing. However, it is contemplated that a variety of other agitation methods can be employed in order to perform this mixing.

Figure 7:
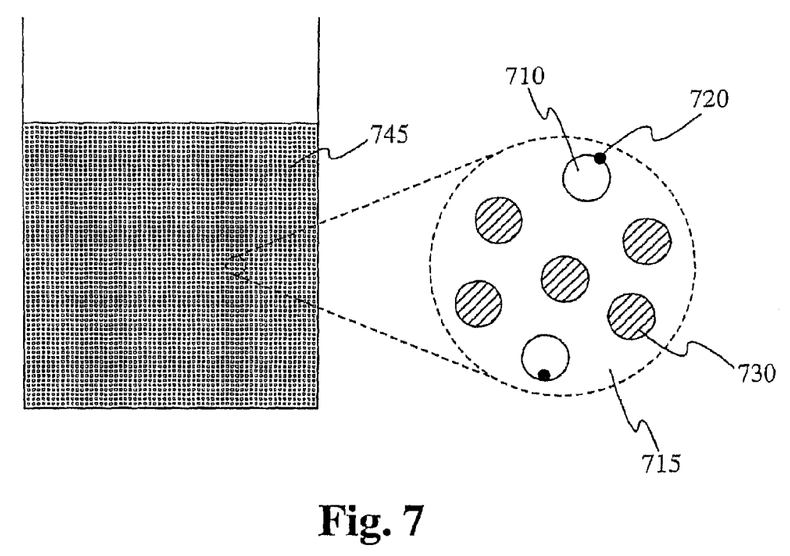
FIG. 7 illustrates one embodiment of a mixture of the dispersion of support/catalytic particles of FIG. 6A and the dispersion of mobility-inhibiting particles of FIG. 6B in accordance with the principles of the present invention.

FIG. 7 illustrates one embodiment of a mixture 745 of the dispersions in one container. The mixture 745 comprises a plurality of support particles 710, each having a catalytic particle 720 bonded to it, and mobility-inhibiting particles 730. The particles are separated by the liquid 715, which can comprise any dispersion liquids and surfactants (or other dispersing aids) used in the prior steps.

At step 240, the dispersion liquid is removed from the mixture to form a dried mixture. It is contemplated that the liquid can be removed in a variety of ways. In one embodiment, the dispersion of particles is freeze-dried. The mixture is poured into a freeze-dry appropriate vessel. It is then frozen with liquid nitrogen or some other medium that is cool enough to freeze the dispersion of particles. In one embodiment, the liquid nitrogen, or other freezing medium, is at approximately −60 degrees Celsius. However, it is contemplated that the liquid nitrogen, or other freezing medium, can be used at other temperatures as well. The mixture is then placed into a vacuum system, where the dispersion of particles remains frozen as the water, or other dispersing liquid, is removed via vacuum pressure. In one embodiment, a vacuum pressure of approximately 10 microns is employed. In other embodiments, a vacuum pressure of between approximately 2 microns and approximately 5 microns is employed.

The vacuum pressure removes the water and any other liquid in the mixture having a higher vapor pressure than water. However, in some embodiments, the surfactant remains with the frozen dispersion of particles. The removal of the water leaves a porous powder structure of the support/catalytic particles and the mobility-inhibiting particles, with the surfactant disposed within the pores. The resulting powder is in an intermediate state, being loosely bonded together, yet dry to the touch, providing mechanical handling ability.

At step 250, the dried mixture is calcined, thereby baking off any surfactant and forming clusters of mobility-inhibiting particles bonded between the support/catalytic particles. In some embodiments, the powder is placed in a crucible. It is contemplated that the crucible can be made of ceramic or a variety of other materials. The crucible is then placed in a calcining furnace, where it is heated at a given temperature for a given time. In some embodiments, the crucible is heated in the calcining furnace at approximately 550 degrees Celsius for approximately 2 hours. However, it is contemplated that other temperatures and heating time can be employed as well. In some embodiments, the crucible is placed in a furnace that has already been preheated to the desired baking temperature. Test results have shown that by preheating the furnace before placing the crucible inside, instead of ramping up the temperature to the desired temperature while the crucible is in the furnace, the dispersion of the metal particles can be maximized. However, it is contemplated that, in some embodiments, the furnace temperature can be ramped up while the crucible is in the furnace. In some embodiments, a ramp rate of 1-50 degrees Celsius is employed to raise the temperature of the furnace while the crucible is inside. In a preferred embodiment, the furnace provides an ambient air environment within which the crucible, and consequently the powder, can be heated. It is contemplated that the environment within the furnace need not comprise air. However, it preferably contains some amount of oxygen.

Figure 8:
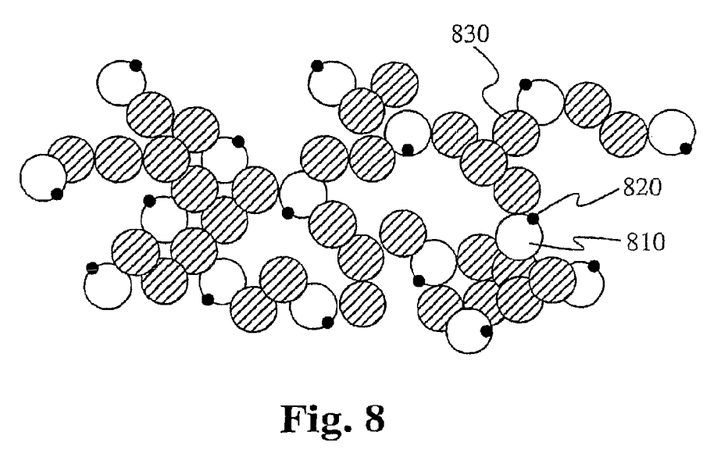
FIG. 8 illustrates one embodiment of a cluster of mobility-inhibiting particles bonded between support/catalytic particles in accordance with the principles of the present invention.

The calcining of the dried mixture takes it from a Van der Waals or proximity attraction between the particles to an actual covalent bond between the particles, resulting in a surfactant-free agglomeration of the support/catalytic particles and the mobility-inhibiting particles. FIG. 8 illustrates one embodiment of a cluster of mobility-inhibiting particles 830 bonded between support particles 810, which have catalytic particles 820 bonded to them. In some embodiments, the present invention produces clusters in the range of 0.5-50 microns. In some embodiments, the present invention produces clusters in the range of 5-10 microns. However, it is contemplated that other cluster sizes can be produced as well.

In some embodiments, the loading percentages of the powders (support, catalyst, and mobility-inhibiting) are adjusted in order to achieve a desired powder concentration for each particular type of powder in the resulting clusters. In some embodiments, a 0.01-15% loading of catalyst powder is employed. In a preferred embodiment, a 0.5-3% loading of catalyst powder is employed. However, it is contemplated that other loading percentages can be employed as well.

In a preferred embodiment, the support particles, the catalyst particles, and the mobility-inhibiting particles in the resulting clusters are nano-particles. Preferably, the support particles and the mobility-inhibiting particles have a maximum diameter of 500 nanometers and a minimum diameter of between 1-5 nanometers, while the catalyst particles have a diameter in the range of 0.5-5 nanometers. In some embodiments, the diameter of the support particles and the mobility-inhibiting particles is in the range of 5-20 nanometers. In some embodiments, the diameter of the support particles and the mobility-inhibiting particles is in the range of 10-15 nanometers and the diameter of the catalyst particles is in the range of 2-5 nanometers. However, it is contemplated that other particle sizes can be employed.

The introduction and bonding of mobility-inhibiting particles to and between the support/catalytic particles prevents the catalytic particles from moving from one support particle to another, thereby preventing the coalescence of the catalytic particles. As a result, the size of the individual catalytic particles can be minimized and the total catalytic surface area of the cluster can be maximized.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of forming a catalyst, comprising:
   providing a plurality of support particles and a plurality of mobility-inhibiting particles, wherein each support particle in the plurality of support particles is bonded with its own catalytic particle; and
   bonding the plurality of mobility-inhibiting particles to the plurality of support particles,
   wherein each support particle is separated from every other support particle in the plurality of support particles by at least one of the mobility-inhibiting particles,
   wherein the mobility-inhibiting particles are configured to prevent the catalytic particles from moving from one support particle to another support particle, and
   wherein providing the plurality of support particles comprises:
   nano-sizing a precursor support powder that has an average grain size equal to or greater than 1 micron;
   nano-sizing a precursor catalytic powder that has an average grain size equal to or greater than 1 micron; and
   bonding the nano-sized catalytic powder to the nano-sized support powder, thereby forming the plurality of support particles with each support particle in the plurality of support particles bonded with its own catalytic particle.

2. The method of claim 1, wherein:
   nano-sizing the precursor support powder and the precursor catalytic powder comprises applying a plasma stream to the precursor support powder and to the precursor catalytic powder, thereby vaporizing the precursor support powder and the precursor catalytic powder; and
   bonding the nano-sized catalytic powder to the nano-sized support powder comprises condensing the vaporized support powder and the vaporized catalytic powder, thereby forming the plurality of support particles with each support particle in the plurality of support particles bonded with its own catalytic particle.

3. The method of claim 1, wherein providing the plurality of mobility-inhibiting particles comprises nano-sizing a precursor mobility-inhibiting powder that has an average grain size equal to or greater than 1 micron.

4. The method of claim 3, wherein nano-sizing the precursor mobility-inhibiting powder comprises:
   applying a plasma stream to the precursor mobility-inhibiting powder, thereby vaporizing the precursor mobility-inhibiting powder; and
   condensing the vaporized mobility-inhibiting powder.

5. The method of claim 1, wherein providing the plurality of support particles and the plurality of mobility-inhibiting particles comprises:
   dispersing the plurality of support particles in a dispersion liquid, wherein each support particle in the plurality of support particles is bonded with its own catalytic particle;
   dispersing the plurality of mobility-inhibiting particles in a dispersion liquid; and
   mixing the dispersed support particles with the dispersed mobility-inhibiting particles, thereby forming a mixture of the dispersed support particles and the dispersed mobility-inhibiting particles.

6. The method of claim 5, wherein the dispersion liquid for at least one of the support particles and the mobility-inhibiting particles comprises water.

7. The method of claim 5, wherein the dispersion liquid for at least one of the support particles and the mobility-inhibiting particles comprises an organic liquid.

8. The method of claim 7, wherein the organic liquid is a glycol ether.

9. The method of claim 5, wherein at least one of dispersing the plurality of support particles and dispersing the plurality of mobility-inhibiting particles comprises adding a surfactant to the dispersion liquid.

10. The method of claim 9, wherein the surfactant is selected from the group consisting of a carboxylic acid, a polyamine, and a polyether.

11. The method of claim 5, wherein the dispersed support particles and the dispersed mobility-inhibiting particles are mixed using a sonication process.

12. The method of claim 5, wherein the step of bonding at least one mobility-inhibiting particle to and between each support particle in the plurality of support particles, comprises the step of freeze-drying the mixture of dispersed support particles and dispersed mobility-inhibiting particles, thereby forming a dried mixture of dispersed support particles and dispersed mobility-inhibiting particles.

13. The method of claim 12, wherein the step of bonding at least one mobility-inhibiting particle to and between each support particle in the plurality of support particles comprises the step of calcining the dried mixture of dispersed support particles and dispersed mobility-inhibiting particles.

14. The method of claim 1, wherein the plurality of support particles comprises a plurality of alumina particles.

15. The method of claim 1, wherein the catalytic particles comprise platinum.

16. The method of claim 1, wherein the plurality of mobility-inhibiting particles comprises a different chemical composition than the plurality of support particles.

17. The method of claim 16, wherein the plurality of mobility-inhibiting particles comprises a plurality of ceramic particles.

18. The method of claim 16, wherein the plurality of mobility-inhibiting particles comprises a plurality of metal-oxide particles.

19. The method of claim 1, wherein:
each support particle in the plurality of support particles has a diameter between 1 nanometer and 500 nanometers;
each catalytic particle has a diameter between 0.5 nanometers and 5 nanometers; and
each mobility-inhibiting particle in the plurality of mobility-inhibiting particles has a diameter between 1 nanometer and 500 nanometers.

20. A method of forming a catalyst, comprising:
providing a plurality of support particles and a plurality of mobility-inhibiting particles, wherein each support particle in the plurality of support particles is bonded with its own catalytic particle;
dispersing the plurality of support particles in a dispersion liquid, thereby forming a dispersion of support particles;
dispersing the plurality of mobility-inhibiting particles in a dispersion liquid, thereby fanning a dispersion of mobility-inhibiting particles;
mixing the dispersion of support particles with the dispersion of mobility-inhibiting particles, thereby forming a wet mixture;
freeze-drying the wet mixture, thereby forming a dried mixture; and
calcining the dried mixture, thereby forming a cluster of the plurality of support particles and the plurality of mobility-inhibiting particles, wherein each support particle is separated from every other support particle in the plurality of support particles by at least one of the mobility-inhibiting particles, and wherein the mobility-inhibiting particles are configured to prevent the catalytic particles from moving from one support particle to another support particle.

21. The method of claim 20, wherein providing the plurality of support particles and the plurality of mobility-inhibiting particles comprises:
nano-sizing a precursor support powder that has an average grain size equal to or greater than 1 micron;
nano-sizing a precursor catalytic powder that has an average grain size equal to or greater than 1 micron;
bonding the nano-sized catalytic powder to the nano-sized support powder, thereby forming the plurality of support particles with each support particle in the plurality of support particles bonded with its own catalytic particle; and
nano-sizing a precursor mobility-inhibiting powder that has an average grain size equal to or greater than 1 micron.

22. The method of claim 21, wherein the steps of nano-sizing the precursor powders comprise:

applying a plasma stream to the precursor powders, thereby vaporizing the precursor powders; and
condensing the vaporized powders.

23. The method of claim 20, wherein the dispersion liquid for at least one of the support particles and the mobility-inhibiting particles comprises water.

24. The method of claim 20, wherein the dispersion liquid for at least one of the support particles and the mobility-inhibiting particles comprises an organic liquid.

25. The method of claim 24, wherein the organic liquid is a glycol ether.

26. The method of claim 20, wherein at least one of dispersing the plurality of support particles and dispersing the plurality of mobility-inhibiting particles comprises adding a surfactant to the dispersion liquid.

27. The method of claim 26, wherein the surfactant is selected from the group consisting of a carboxylic acid, a polyamine, and a polyether.

28. The method of claim 20, wherein the step of mixing the dispersion of support particles with the dispersion of mobility-inhibiting particles comprises using a sonication process.

29. The method of claim 20, wherein the plurality of support particles comprises a plurality of alumina particles.

30. The method of claim 20, wherein the catalytic particles comprise platinum.

31. The method of claim 20, wherein the plurality of mobility-inhibiting particles comprises a different chemical composition than the plurality of support particles.

32. The method of claim 31, wherein the plurality of mobility-inhibiting particles comprises a plurality of ceramic particles.

33. The method of claim 31, wherein the plurality of mobility-inhibiting particles comprises a plurality of metal-oxide particles.

34. The method of claim 20, wherein:
each support particle in the plurality of support particles has a diameter between 1 nanometer and 500 nanometers;
each catalytic particle has a diameter between 0.5 nanometers and 5 nanometers; and
each mobility-inhibiting particle in the plurality of mobility-inhibiting particles has a diameter between 1 nanometer and 500 nanometers.

35. A catalyst comprising:
a plurality of support particles, wherein each support particle in the plurality of support particles is bonded with its own catalytic particle; and
a plurality of mobility-inhibiting particles bonded to the plurality of support particles,
wherein each support particle is separated from every other support particle in the plurality of support particles by at least one of the mobility-inhibiting particles,
wherein the mobility-inhibiting particles are configured to prevent the catalytic particles from moving from one support particle to another support particle, and
wherein the plurality of support particles comprises a plurality of alumina particles.

36. The catalyst of claim 35, wherein the catalytic particles comprise platinum.

37. The catalyst of claim 35, wherein the plurality of mobility-inhibiting particles comprises a different chemical composition than the plurality of support particles.

38. The catalyst of claim 37, wherein the plurality of mobility-inhibiting particles comprises a plurality of ceramic particles.

39. The catalyst of claim 37, wherein the plurality of mobility-inhibiting particles comprises a plurality of metal-oxide particles.

40. A catalyst comprising:
a plurality of support particles, wherein each support particle in the plurality of support particles is bonded with its own catalytic particle; and
a plurality of mobility-inhibiting particles bonded to the plurality of support particles,
wherein each support particle is separated from every other support particle in the plurality of support particles by at least one of the mobility-inhibiting particles,
wherein the mobility-inhibiting particles are configured to prevent the catalytic particles from moving from one support particle to another support particle, and
wherein
  each support particle in the plurality of support particles has a diameter between 1 nanometer and 500 nanometers;
  each catalytic particle has a diameter between 0.5 nanometers and 5 nanometers; and
  each mobility-inhibiting particle in the plurality of mobility-inhibiting particles has a diameter between 1 nanometer and 500 nanometers.

* * * * *